United States Patent

[11] 3,552,680

[72] Inventor Chester W. Newell
San Jose, Calif.

[21] Appl. No. 683,701
[22] Filed Nov. 16, 1967
[45] Patented Jan. 5, 1971

[73] Assignee Newell Industries, Inc.
Sunnyvale, Calif.
a corporation of California

[54] TAPE TRANSPORT APPARATUS

3 Claims, 2 Drawing Figs.

[52] U.S. Cl. .......... 242/192, 64/27
[51] Int. Cl. .......... F16d 3/14, G11b 15/32
[50] Field of Search .......... 242/55.14, 55.13, 55.12, 55.11, 67.5, 67.4, 67.3, 54.1, 192, 201; 64/27S, 27B, 15B, 10, 14, 27R, 27L

[56] References Cited

UNITED STATES PATENTS

| | | | |
|---|---|---|---|
| 3,408,016 | 10/1968 | Ganske et al. | 242/192 |
| 1,425,177 | 8/1922 | Constable | 64/27(B) |
| 1,932,205 | 10/1933 | Dina | 64/27(L) |
| 1,963,188 | 6/1934 | Wood | 64/27(B)X |
| 2,605,056 | 7/1952 | DeKanski et al. | 242/54.1 |
| 3,370,804 | 2/1968 | Peyton | 242/55.14X |

*Primary Examiner*—George F. Mautz
*Attorney*—Flehr, Hohbach, Test, Albritton & Herbert ABSTRACT: A magnetic tape transport feeds pliable tape from supply to takeup rolls by means of a motor driven capstan engaging the rolls. A yieldable resilient coupling between motor and capstan takes out "once around" motor speed fluctuations but forms a solid drive connection for rapid acceleration of the system. Bearings supporting the capstan and the rolls all lie in a common plane coplanar to the plane of both the rolls and the capstan to eliminate forces acting upon the bearings other than those forces acting normal to the axis defined by the bearings. In addition, the rolls are carried on pivotable radius arms which include broad confronting support surfaces precluding tilting or twisting of the radius arms. Viscous material between the confronting surface serves to introduce a viscous drag to movement of the radius arms which aids in eliminating transient disturbances at the interface between each roll and the capstan, and also serves to provide a differential of compressive forces acting across the tape drive capstan so as to maintain the tape under tension across the capstan.

INVENTOR.
CHESTER W. NEWELL

BY Flehr, Hohbach, Test, Albritton & Herbert

ATTORNEYS

TAPE TRANSPORT APPARATUS

BACKGROUND OF THE INVENTION AND OBJECTS

In U.S. Letters Pat. No. 3,370,803 noted above, there is disclosed an embodiment of a tape transport apparatus of a type wherein a pliable magnetic recording tape is wrapped to form supply and takeup rolls. A capstan, having a resilient tire thereabound, engages the edges of the rolls in a so-called "rim-driven" relationship for feeding the tape from one roll to the other. Each of the tape rolls is supported on a swing arm and urged into engagement with the capstan.

It has been suggested that tape transport apparatus of the type as reviewed above may inherently require relatively expensive bearings due to the fact that the bearings associated with the roll-support spindles may be subjected to "cantilevering" forces. Thus, forces acting to tilt the plane of the tape rolls relative to the axis of rotation so as to deflect the axis of rotation defined by the support spindles to a posture other than perpendicular to the roll, can serve to impose severe requirements on the bearings. In addition, it has further been suggested that unusually expensive motor bearings may be required in an arrangement as disclosed in apparatus of the type reviewed above in view of the fact that the motor bearings are utilized to support and define the disposition of the drive capstan and are thereby subject to absorbing all shock and other forces acting (via the capstan) laterally against the outer end of the motor shaft.

In addition to the foregoing, it has been observed that a capstan drive motor of a type as may be coupled to drive a capstan as above arranged normally manifests transient shaft speed fluctuations, commonly referred to as "once around" fluctuations of the motor. It is believed that these fluctuations are ordinarily attributable to the existence of a field pattern of the type which characterizes conventional motor constructions.

Such fluctuations, even though relatively small, can, nevertheless, introduce objectionable disturbances to the signals recorded and played back from the tape record. Hence, any such fluctuations are ideally to be totally eliminated.

It is, therefore, a general object of the present invention to provide an improved tape transport apparatus which overcomes the foregoing and other limitations.

It is a more particular object of the present invention to provide an improved tape transport apparatus of a type wherein a drive capstan for moving tape is isolated from speed fluctuations of a drive motor coupled to the capstan.

Another object of the present invention is to provide a tape transport apparatus of the foregoing type arranged in an improved manner to eliminate the need for expensive critical tolerance bearings for the rotating parts of the transport.

These and other objects of the invention will become more readily apparent from the following description.

SUMMARY OF THE INVENTION

Briefly stated, a resiliently yieldable drive coupling has been interposed between the capstan drive motor and the capstan in apparatus of the foregoing type. The capstan is further disposed relative to the rolls of tape so as to be subject to the inertia developed by the mass of the rolls during feeding of tape from one to the other whereby the inertia serves to resist motor-originated speed fluctuations applied to the capstan. Thus, the resilient coupling absorbs unsustained changes in capstan speed. However, the resilient coupling is arranged so as to provide positive limits to the resilient movement of the coupling whereby a predetermined minimum sustained motor acceleration (rate of change in motor speed) serves to provide an unyielding drive connection directly transmitting motor torque to the tape rolls.

Inasmuch as the inertia developed by the mass of the rolls serves to override capstan speed fluctuations due to the presence of the resiliently yieldable coupling interposed between the motor and capstan, the invention is further characterized by an arrangement which serves to eliminate bounce and like disturbances between rolls and capstan. Thus, there is provided means forming a viscous drag which serves to smooth the advancing and retreating movements of the axes of rotation of the tape rolls relative to the drive capstan. In addition to providing a viscous drag for the foregoing purpose, the means employed serves to stabilize the axes of rotation so as to preclude deflection of the axes of rotation without employing relatively massive radius arms and support structures. The viscous means further serves to provide a restraint to the advancing and retreating movements of the supply and takeup rolls so as to develop a greater contact pressure between the takeup roll and the capstan than between the supply roll and capstan whereby tape on the capstan is subjected to a proper tension.

The foregoing general arrangement of the invention may be better understood by reference to the following detailed description of a preferred embodiment when considered in conjunction with the drawings in which:

FIG. 1 is a perspective schematic view of a tape transport apparatus, according to the invention; and FIG. 2 is an exploded view in perspective of tape transport apparatus, according to the invention.

DESCRIPTION OF THE PREFERRED EMBODIMENT

Figures 1, 2:
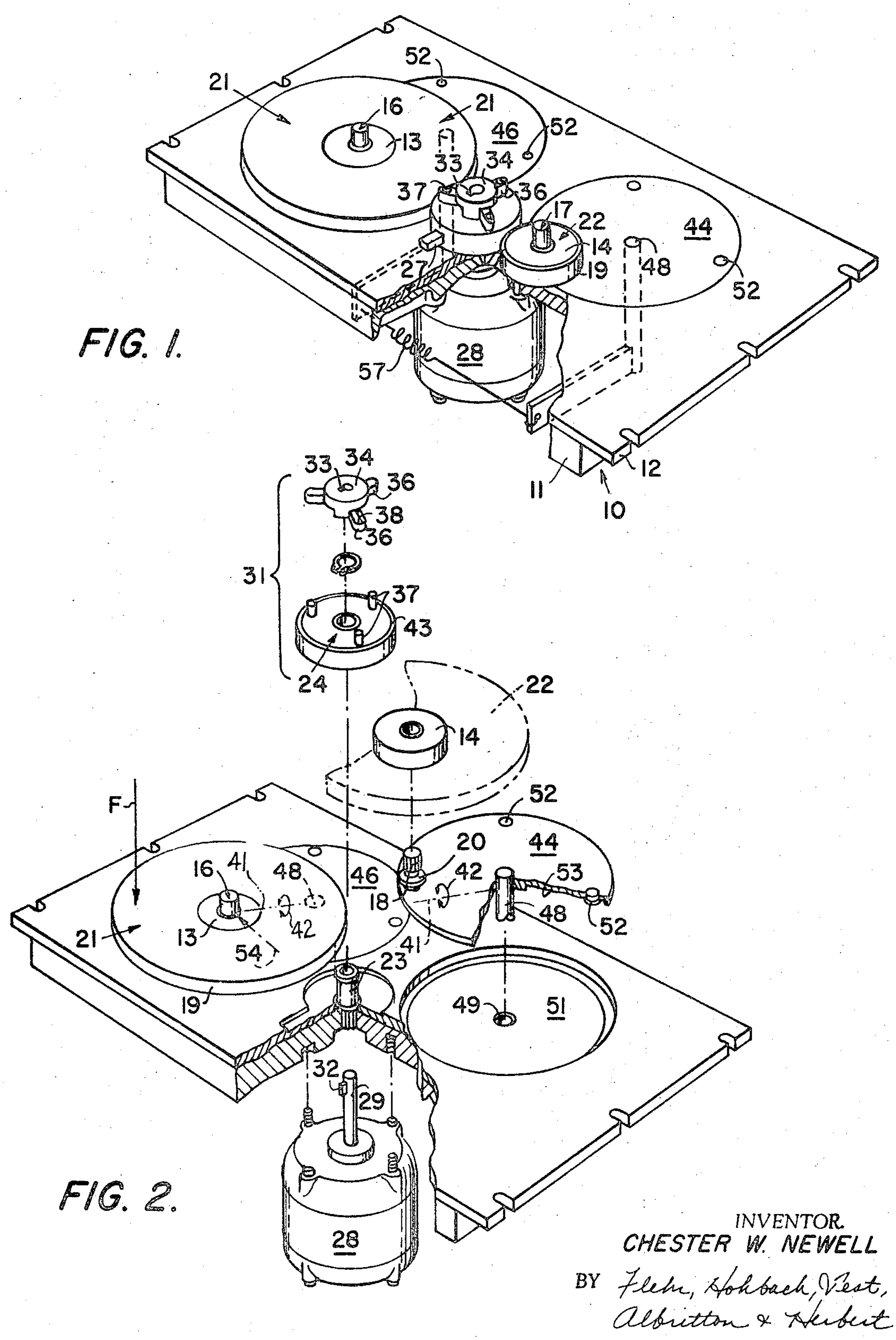

Referring to the drawings, a base 11 provided with a top plate 12 serves, generally, to define a tape deck construction 10.

Supply and takeup hubs 13, 14 are mounted for rotation upon spindle assemblies 16, 17, respectively. Each of spindle assemblies 16, 17 includes a bearing 18 disposed concentric to the axis of rotation of its associated roll of tape 19. Bearings 18 of assemblies 16, 17 include an apron or flange 20 which serves to support the supply and takeup rolls 21, 22 so that the bearings lie in coplanar relation to the plane of rolls 21, 22.

In similar fashion, a bearing 23 serves to support an annular body forming the flanged drive capstan 24. Thus, bearing 23 for capstan 24 lies in coplanar relation to the plane of rolls 21, 22 and capstan 24. (Flanges of capstan 24 have been removed for clarity.)

A recording transducer 27 cooperates with tape 19 for recording and playing back signals with respect to the tape, carried by capstan 24.

The drive shaft 29 of a motor 28, secured beneath base 11, serves to rotate capstan 24 by means which forms a resiliently yieldable coupling interposed between motor 28 and capstan 24 and arranged in a manner whereby capstan 24 will be subject to the inertia developed by the rotating mass of rolls 21, 22. Thus, the inertia will override and resist short term motor-originated speed fluctuations appearing on shaft 29.

The arrangement, as now to be described, generally includes means serving to limit the resilient movement of the coupling arrangement to a point where a predetermined minimum sustained rate of change in motor speed, as encountered for example during acceleration, serves to form an unyielding drive connection directly transmitting motor torque to tape rolls 21, 22.

Referring to the drawing, the resiliently yieldable coupling assembly 31 includes a key 32 formed to rotate with shaft 29. Key 32 cooperates with keyway 33 formed in a hub member 34.

Hub member 34 carries three resilient elongated members, in the form of laterally outwardly extending closed loops 36 of a suitable resilient material, such as spring steel. The inner ends of loops 36 are secured to hub 34 in any suitable manner. Three posts 37 are fixed to protrude upwardly from the side of capstan 24 in positions whereby they extend into, and are spaced inwardly from the laterally outer ends 38 of each associated one of loops 36. As thus arranged, posts 37 are coupled by loops 36 whereby rotation of hub 34 serves to rotate capstan 24. Accordingly, rotation of capstan 24 is through the resilient loops 36, and during acceleration of motor 28, hub 34 will be rotationally displaced relative to capstan 24.

Capstan 24 is disposed in "rim-driving" relation to the edge of each roll 21, 22. Accordingly, in the event of a speed fluctuation appearing on motor shaft 29, capstan 24 will not be affected since it will then be subject to the inertia of the rotating rolls 21, 22 whereby such speed fluctuation will merely be absorbed by the resilience of loops 36.

On the other hand, in the event that motor 28 is accelerated to provide a sustained rate of change of speed thereof (above the very lowest of gradual increases in speed representing a predetermined minimum level of acceleration determined by the resilience of loops 36 and mass of rolls 21, 22), the resilience of loops 36 permits hub 34 to be rotationally displaced relative to capstan 24 until posts 37 engage the outer ends 38 of loops 36. At that point, the resilience of member 36 will no longer be effective to absorb the changing speed applied to shaft 29, and accordingly, a solid drive connection between shaft 29 and capstan 24 will be established. From this point on, rotation of shaft 29 drives capstan 24 directly via an unyielding connection.

Furthermore, it will be readily evident that during continuous constant speed rotation of capstan 24, the resilient members 36 serve to absorb fluctuations in speed experienced by shaft 29 due to such conditions as, for example, the problems of "once around" motor fluctuations.

As capstan 24 rotates to feed tape from supply roll 21 to takeup roll 22, hubs 13, 14, respectively advance and retreat with respect to capstan 24. Accordingly, each hub 13, 14 is mounted for rotation on an associated one of spindle assemblies 16, 17. Spindle assemblies 16, 17 are respectively carried on radius arms, as schematically represented by the phantom line 41. The manner of providing support for spindle assemblies 16, 17 serves to eliminate any tendency for radius arms 41 to be twisted about their longitudinal axes in the directions indicated by the arrow 42. The support arrangement further serves to smooth out the advancing and retreating movements of hubs 13, 14 by providing viscous resistance, or damping, to such movements.

Thus, it will be readily apparent that in a tape transport arrangement as shown in the drawings, the tape rolls may develop a tendency to bounce slightly with regard to the resilient driving tire 43 carried around capstan 24. Such a tendency can introduce problems, if not corrected, in transducing signals with respect to the tape.

In order to support hubs 13, 14 to advance and retreat relative to capstan 24, each spindle assembly 16, 17 is mounted upon a spindle support plate 44, 46 which in turn is mounted for pivotal movement upon a stub shaft 48 carried in a bushing 49 formed concentrically of a relatively broad flat support surface or pedestal 51.

The surface of pedestals 51 lie in the same plane and, hence, are readily machined on the casting which forms base 11. The plane of each spindle support plate 44, 46 is given stability against tipping or tilting by virtue of the very nature of its relatively broad platform base which extends widely laterally of the axis of rotation defined by spindle assemblies 16, 17. Each support plate 44, 46 rests on three low-friction buttons or feet 52 (such as made of teflon) which extend downwardly an amount on the order of 0.005 or 0.010 of an inch below the undersurface 53 to ride on surface 51.

The space between the confronting surfaces 51, 53 of each pair of members (i.e., one of pedestal portions 51 and plate 44 or 46 as the case may be) is adapted to contain a deposit of material serving to provide mutual viscous support between these surfaces as well as to impose a viscous drag upon the movement of one of the surfaces relative to the other for minimizing transient disturbances in the advancing and retreating movements of spindle assemblies 16, 17 to thereby smooth such movements during feeding of tape. Accordingly, prior to assembling apparatus as shown in FIG. 2, a deposit of material, such as a suitable grease or silicone fluid may be interposed between surfaces 51, 53 to introduce a limited fluid viscosity or viscous drag therebetween.

The purpose of the grease (or other material) is not only to act as a lubricating agent but to utilize its viscosity characteristic and, also, by suitable fillers, to generate kinetic friction resistance to accomplish a number of important functions. As a lubricant for support of the low-friction teflon buttons 52, the grease brings uniformity to the friction losses found in the advancing and retreating movements of hubs 13, 14.

By adding suitable fillers so as to slightly decrease the antifriction nature of the grease, the friction between buttons 52 and their supporting surfaces of pedestals 51, as well as the interparticle shearing friction in the grease itself, can be effective to develop a kinetic friction resistance. This resistance serves then to develop a differential in compressive forces acting between the capstan tire and takeup roll and the capstan tire and supply roll so as to effect proper tensioning of the tape on the capstan. By variously drawing buttons 52 into engagement with pedestals 51 this resistance can be readily varied.

The viscosity of the grease is used to impede the transmission of transient perturbations across the capstan/roll interfaces. Recognizing, however, that some perturbations may nevertheless be transmitted via the capstan/roll interfaces into the system, the kinetic friction resistance of the grease further functions to dissipate the energy of any such perturbations entering the system and thereby provides coulombic damping of such perturbations.

Each spindle assembly 16, 17 carries a bearing 18 concentric to and supporting its associated spindle assembly 16 or 17. Bearing 23 as noted above, supports capstan 24 for rotation and all of the bearings 18, 23 are disposed to lie in essentially the same plane as defined by rolls 21, 22 and capstan 24. In this manner, the lateral movements (of rolls 21, 22 relative to capstan 24) which generate forces therebetween, act upon bearings 18 or 23 solely via the plane which is common to the bearings, the rolls and the capstan 24. This action is represented by the phantom line 54.

Accordingly, it will be readily apparent that by containing the laterally acting forces within the plane of the rolls themselves and within the plane of the capstan itself and providing the bearings within the same plane to receive these forces, the respective axes of rotation defined by such bearings will readily remain normal to such plane and "cantilevering" forces will be virtually eliminated. For example, any forces acting normal to the plane of roll 21, as represented by the arrow, F, in FIG. 2, impose a severe requirement upon the bearing associated with spindle assembly 16 since such force will serve to attempt to tilt the plane of roll 21. This action is further transmitted through the capstan/roll interface to both capstan 24 and roll 22. On the other hand, forces acting solely against the bearings of spindle assembly 16 along a radial line such as 54 will impose no such requirement upon the bearings of assembly 16.

As noted above, each spindle assembly 16, 17 is mounted on a radius arm as schematically represented by the phantom line 41 and each is provided pivotal movement by rotation of one of plates 44, 46. In order to cause hubs 13, 14 to advance and retreat relative to the driving surface of capstan 24 during feeding of tape, a spring 57 applies equal spring force to rotate stub shafts 48 in a direction oriented whereby the rolls will be urged against capstan 24. Greater pressure or compressive force will be applied between takeup roll 22 and the resilient capstan tire 43 than is applied between supply roll 21 and tire 43 due to the fact that kinetic friction resistances caused by the viscous drag between plates 44, 46 and pedestals 51 serve to add to and subtract from the otherwise equal compressive forces applied by spring 57 and thereby provides a greater compressive force between capstan tire 43 and takeup roll 22 than between tire 43 and the supply roll 21. This force differential serves to maintain the tape under tension as it travels from one roll to the other. The reasons for operation in this mode are more fully explained in the above identified U.S. Pat. No. 3,370,804.

The degree of the force differential across capstan 24 can be readily varied by employing any suitable means for drawing the buttons 52 on plates 44, 46 more tightly or loosely into contact with the surface of pedestals 51 to vary the kinetic friction resistance therebetween.

From the foregoing, it will be readily apparent that there has been provided a tape transport apparatus which can be constructed of extremely lightweight components without sacrifice of the rigidity required to prevent deflection from the perpendicular of axes of rotation of the support spindles.

Furthermore, the advancing and retreating movements of the rolls of tape relative to the drive capstan are smoothed out to eliminate and dissipate transient disturbances, such as bouncing and the like, or other objectionable perturbations, which tend to develop in a rim-driven arrangement.

It will also be appreciated that by providing a resilient coupling between drive motor 28 and capstan 24, fluctuations in motor speed are absorbed and eliminated without impairing the capability of the transport apparatus to rapidly accelerate through a solid drive connection.

The above construction readily facilitates servicing and replacement of parts as will be apparent.

I claim:

1. In a tape transport of a type for feeding a length of pliable recording tape wrapped to form generally planar, rotatable supply and takeup rolls lying in a common plane disposed normal to their axes of rotation and wherein an annular rotating body lies in said common plane of said rolls and engages said rolls, wherein a motor drives the body to feed the tape, said body and rolls each being supported by support means defining its axis of rotation, and wherein the axes of rotation of said rolls advance and retreat laterally relative to the body during feeding of tape; the improvement comprising bearings concentric to each said support means and laterally supporting rotation of each of: said body, said supply roll and said takeup roll respectively; said bearings lying essentially in said common plane of said rolls and body, and means forming a driving connection between said motor and said body to feed tape, the lateral movements of said rolls relative to the body transmitting forces therebetween to their respective bearings solely via said plane common to said bearings, rolls and body.

2. A tape transport of the type adapted to support a length of pliable recording tape wrapped to form supply and takeup rolls, a drive capstan, means for supporting each of said rolls for rotation and to advance and retreat relative to said capstan during feeding of the tape, means for driving said capstan, a resilient peripheral surface around the capstan, means serving to urge the supply and takeup rolls into driving contact with respect to said periphery to respectively provide compressive forces therebetween, and viscous means developing a viscous drag resistance in the advancing and retreating movements of said rolls relative to the capstan to modify said urging to develop a relatively greater compressive force applied between said takeup roll and said capstan periphery than between said supply roll and said periphery.

3. In a tape transport apparatus of the type for feeding a length of pliable recording tape wrapped to form supply and takeup rolls, having annular, resilient rotatable drive means including arcuate surface portions engaging and rotating said rolls during feeding of the tape, means disposing said rolls to advance and retreat relative to said arcuate surface portions during feeding of tape, and means for urging the rolls to engage said portions with a greater force between said takeup roll and said portions than between said supply roll and said portions, the last named means further serving to apply viscous damping to perturbations occurring in said rolls, said last named means including a deposit of viscous material carrying a filler, said deposit providing both kinetic resistance in said advancing and retreating movements to create the difference in said urging and also dissipating transient disturbances in the feeding of the tape.